(12) United States Patent
Christmas et al.

(10) Patent No.: US 12,468,152 B2
(45) Date of Patent: Nov. 11, 2025

(54) MULTI-PLANE DISPLAY DEVICE

(71) Applicant: Envisics Ltd, Milton Keynes (GB)

(72) Inventors: Jamieson Christmas, Milton Keynes (GB); Máté Karner, Milton Keynes (GB); Alexander Cole, Milton Keynes (GB); Sahar Chowdhury, Milton Keynes (GB)

(73) Assignee: Enviscis Ltd, Milton Keynes (GB)

( * ) Notice: Subject to any disclaimer, the term of this patent is extended or adjusted under 35 U.S.C. 154(b) by 517 days.

(21) Appl. No.: 17/787,936

(22) PCT Filed: Mar. 29, 2021

(86) PCT No.: PCT/EP2021/058178
§ 371 (c)(1),
(2) Date: Jun. 22, 2022

(87) PCT Pub. No.: WO2021/198190
PCT Pub. Date: Oct. 7, 2021

(65) Prior Publication Data
US 2023/0032271 A1  Feb. 2, 2023

(30) Foreign Application Priority Data
Apr. 1, 2020  (GB) ..................... 2004795

(51) Int. Cl.
*G02B 27/01* (2006.01)
*B60K 35/10* (2024.01)
(Continued)

(52) U.S. Cl.
CPC .......... *G02B 27/0103* (2013.01); *B60K 35/10* (2024.01); *B60K 35/211* (2024.01);
(Continued)

(58) Field of Classification Search
CPC .............. G02B 27/0103; G02B 5/0252; G02B 5/0284; G02B 27/48; G02B 30/52; G02B 27/0101; G02B 27/01; G02B 5/021
(Continued)

(56) References Cited

U.S. PATENT DOCUMENTS

2003/0067421 A1    4/2003  Sullivan
2013/0265622 A1*  10/2013  Christmas ................ G03H 1/08
                                                                359/9
(Continued)

FOREIGN PATENT DOCUMENTS

EP    2894509 A1 *  7/2015  ......... G02B 27/0101
GB    2576738 A      3/2020
(Continued)

OTHER PUBLICATIONS

Office Action issued in Korean Application 10-2022-7026501 on Jul. 1, 2024 (9 pages).
(Continued)

*Primary Examiner* — William R Alexander
*Assistant Examiner* — Mackenzi Waddell
(74) *Attorney, Agent, or Firm* — Akerman LLP

(57) ABSTRACT

A head-up display is described. A spatial light modulator is arranged to display a diffractive pattern of first picture content and/or second picture content. A screen assembly has first and second diffusers arranged in a stepped configuration so that the first diffuser is spatially offset from the second diffuser by a perpendicular distance. A light source is arranged to illuminate the diffractive pattern such that the first picture content is formed on the first diffuser and/or the second picture content is formed on the second diffuser. An optical system comprising at least one optical element having optical power is arranged so that the first and second diffusers have different object distances to the optical system.

17 Claims, 10 Drawing Sheets

(51) Int. Cl.
  *B60K 35/21* (2024.01)
  *B60K 35/232* (2024.01)
  *B60K 35/60* (2024.01)
  *B60K 35/85* (2024.01)
  *G02B 5/02* (2006.01)

(52) U.S. Cl.
  CPC ............ *B60K 35/232* (2024.01); *B60K 35/85* (2024.01); *G02B 5/0252* (2013.01); *G02B 5/0284* (2013.01); *B60K 35/60* (2024.01); *B60K 2360/29* (2024.01)

(58) Field of Classification Search
  USPC ............................................... 359/13, 19, 29
  See application file for complete search history.

(56) References Cited

U.S. PATENT DOCUMENTS

| | | | |
|---|---|---|---|
| 2015/0346491 A1* | 12/2015 | Christmas | ............ G03H 1/0841 |
| 2018/0314065 A1 | 11/2018 | Li | |
| 2019/0025580 A1 | 1/2019 | Nagano et al. | |
| 2019/0025582 A1 | 1/2019 | Morohashi et al. | |
| 2019/0041641 A1* | 2/2019 | Christmas | ................ G02B 5/26 |
| 2019/0317327 A1 | 10/2019 | Meijering et al. | |

FOREIGN PATENT DOCUMENTS

| | | | | |
|---|---|---|---|---|
| JP | 2016224077 A | 12/2016 | | |
| JP | 2017-077791 A | 4/2017 | | |
| TW | I676823 B | 11/2019 | | |
| WO | WO-2014209431 A1 * | 12/2014 | ......... | G02B 27/0172 |
| WO | 2018223646 A1 | 12/2018 | | |

OTHER PUBLICATIONS

English Translation of Office Action issued in Korean Application 10-2022-7026501 on Jul. 1, 2024 (9 pages).
Burge, "Introductor Optomechanical Engineering—First order optics", Aug. 30, 2016.
Jamieson Christmas et al., "Displays Based on Dynamic Phase-Only Holography", Apr. 27, 2018.
Combined Search and Examination Report for GB2004795.7, mailed Dec. 17, 2020.
International Search Report and Written Opinion for PCT/EP2021/058178, mailed Jul. 22, 2021.

* cited by examiner

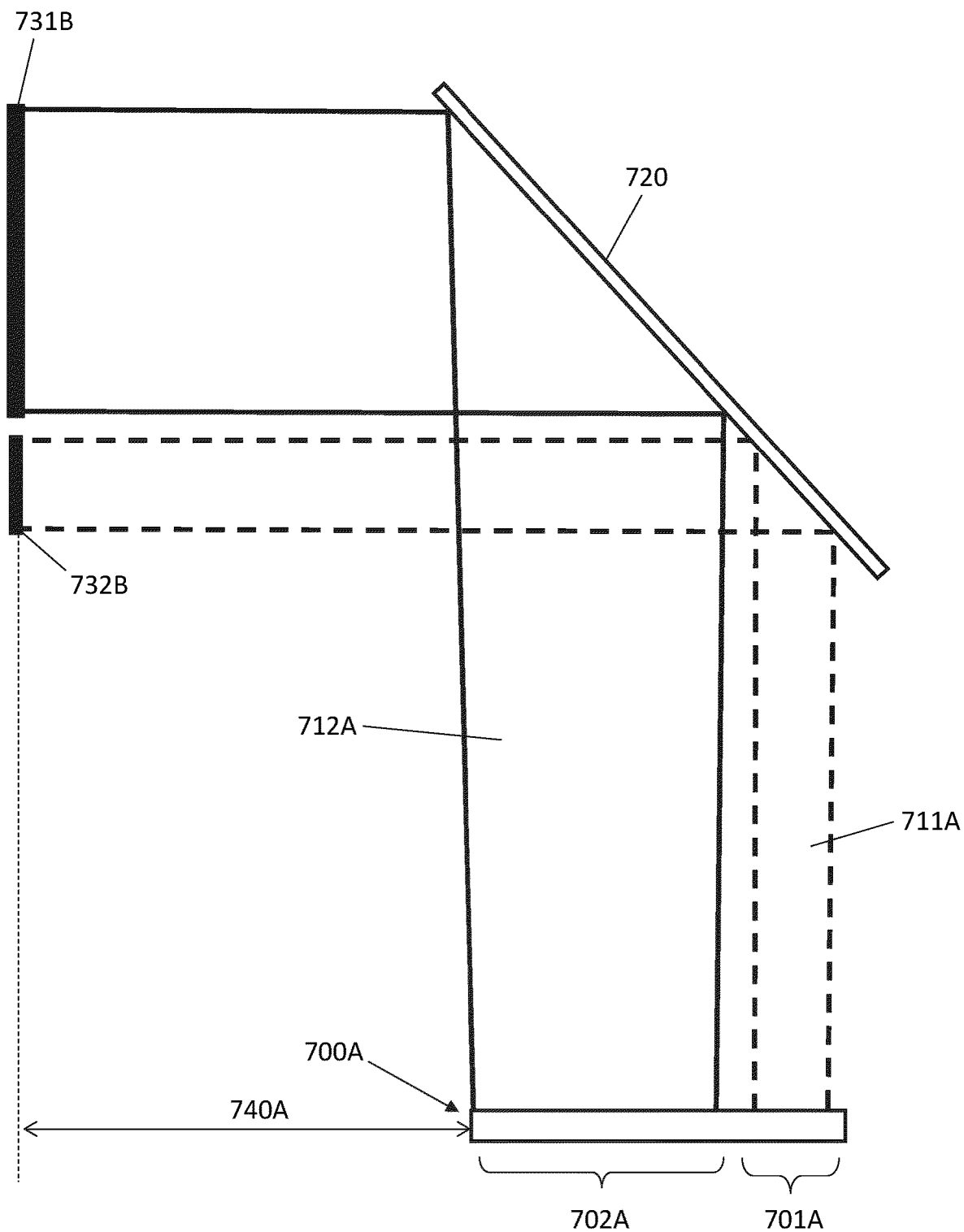
FIGURE 7A – PRIOR ART

MULTI-PLANE DISPLAY DEVICE

RELATED APPLICATIONS

This application claims the benefit under 35 U.S.C. § 371 of the filing date of International Patent Application No. PCT/EP2021/058178, having an international filing date of Mar. 29, 2021, which claims priority to Great Britain Application No. 2004795.7, filed Apr. 1, 2020, the contents of both of which are incorporated herein by reference in their entirety.

FIELD

The present disclosure relates to a projector. More specifically, the present disclosure relates to a holographic projector, a method of holographic projection and holographic projection system. Some embodiments relate to a head-up display. Some embodiments relate to a holographic projector to project multiple images that appear at different distances from a viewer.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A moving diffuser may be used to improve image quality in devices which use coherent light such as holographic projectors.

SUMMARY

Aspects of the present disclosure are defined in the appended independent claims.

There is provided a head-up display having an eye-motion box. The head-up display comprises a spatial light modulator arranged to display a diffractive pattern of first picture content and/or second picture content. It may be said that the diffractive pattern encodes the first picture content and second picture content. In some embodiments, the diffractive pattern comprises a hologram of first picture content and/or second picture content. The diffractive pattern may also comprise at least one lens component/function. The head-up display further comprises a screen assembly comprising a first diffuser and a second diffuser. The first and second diffuser are arranged in a stepped configuration such the first diffuser is spatially offset from the second diffuser by a perpendicular distance. The head-up display further comprises a light source arranged to illuminate the diffractive pattern such that the first picture content is formed or projected on the first diffuser and/or the second picture content is formed or projected on the second diffuser. The head-up display further comprises an optical system having at least one optical element having optical power. The optical system and the screen assembly are arranged so that the first and second diffusers have different object distances to the optical system.

The picture generating unit of a head-up display typically forms all picture content on a single display plane such as the liquid crystal display plane or a projection plane. In operation, an optical system, in co-operation with an optical combiner, typically forms a magnified virtual image of the picture content displayed on the single display plane. A viewer is able to view the magnified virtual image. The optical system may be referred to as an "optical relay system" as described below. More recent head-up displays form virtual image content in the near field and virtual image content in the far field. Such head-up displays may be referred to as dual-plane.

In some examples, first picture content and second picture content are projected by the picture generating unit onto a common projection plane. A dual-plane head-up display can be provided using a first optical system having first optical power corresponding to a first virtual image distance and a second optical system having second optical power corresponding to a second virtual image distance. The first optical power is different to the second optical power such that the first virtual image distance is different to the second virtual image distance. These dual-plane configurations require two sets of optics in the optical system.

There is disclosed herein a stepped screen assembly and a spatial light modulator arranged to display a diffractive pattern (or light modulation pattern). The diffractive pattern is arranged to form a first holographic reconstruction comprising first picture content on a first step (or first diffuser) of the screen assembly and/or a second holographic reconstruction comprising second picture content on a second step (or second diffuser) of the screen assembly. More specifically, the hologram component of the diffractive pattern forms the first and/or second holographic reconstruction. The first step/diffuser is at a first perpendicular distance from the spatial light modulator and the second step/diffuser is at a second perpendicular distance from the spatial light modulator. An optical system can be used to form the two virtual images (first and second pictures) at different virtual image planes (e.g. in the near field and far field) because the "object distance" (distance from optic to the "object") corresponding to the first picture content is different to the "object distance" corresponding to the second picture content. The same optical element(s) having optical power therefore receives light of the first picture content and light of the second picture content. The person skilled in the art of optics knows how to achieve a desired first and second virtual image distance using first and second "object distances" and a common optic (e.g. lens or curved/shaped mirror) having optical power.

The first diffuser and the second diffuser are substantially parallel. That is, the first and second diffusers are arranged in parallel planes. In some arrangements, the spatial light modulator may be substantially parallel to the first and second diffusers. In this case, the spatially modulated light propagates from the spatial light modulator to the first and second diffusers in a direction (along a propagation axis) that is entirely perpendicular to the first and second diffusers. In other arrangements, one or more mirrors may reflect spatially modulated light from the spatial light modulator to the first and second diffusers. In this case, the spatially modulated light propagates from the spatial light modulator to the first and second diffusers in a direction (along a propagation axis) that may be folded or turned and a last part of the propagation path (along the propagation axis) is perpendicular to the first and second diffusers.

In some embodiments, the diffraction pattern (light modulation pattern) comprises a first component (corresponding to the first picture content) and a second component (corresponding to the second picture content). The first component may comprise a first Fourier hologram (of the first picture content) and a first lensing function. The second component may comprise a second Fourier hologram (of the second picture content) and a second lensing function. It may be said that the first/second lensing function defines the distance that the spatially modulated light travels (along the light propagation axis) from the diffractive pattern (first/second hologram) to the replay plane for holographic reconstruction of the first/second component (herein also referred to as the "first/second Fourier path length"). In some embodiments, the first component may be displayed on a first subset of pixels of the spatial light modulator (e.g. a first half) and the second component may be displayed, at the same time as the first component, on a second subset of pixels of the spatial light modulator (e.g. a second half). Alternatively, the first and second hologram may be indistinguishably combined on the spatial light modulator. In particular, the first and second picture content may be formed using a single or combined hologram. In some embodiments, the hologram is a Fresnel hologram encoding picture content for a first plane and picture content for a second plane.

In some embodiments, first picture content and second picture content are formed or projected on the screen assembly at the same time. In other embodiments, first picture content and second picture content are formed or projected at different times within the integration time of the human eye in accordance with a time multiplexing scheme.

In some embodiments, the screen assembly is a stepped disc arranged to rotate.

In some embodiments, the first lensing function is different to the second lensing function. It may be said that the first lensing function has a first optical power and the second lensing function has a second optical power, wherein the first optical power is different to the second optical power. It may be said that the first Fourier path length is different to the second Fourier path length. Consequently, the replay planes of the first and second picture content are staggered at different distances along the propagation path (i.e., propagation axis of light) from the hologram so that the holographic reconstruction corresponding to the first picture content is formed on the first step/diffuser of the screen assembly, and the holographic reconstruction corresponding to the second picture content is formed on the second step/diffuser of the screen assembly.

In other embodiments, the first lensing function is the same as the second lensing function. Thus, the diffractive pattern forms first picture content and second picture content using a common lensing function. One or more optical elements may be provided along the light propagation path(s) between the diffractive pattern and the respective first step/diffuser and second step/diffuser so that the first Fourier path length is the same as the second Fourier path length. For example, the first picture content is projected onto the first step/diffuser of the screen assembly using a first fold mirror or the like. The second picture content is projected onto the second step/diffuser of the screen assembly using a second fold mirror or the like. The first fold mirror and the second fold mirror may be arranged so that the distance that the spatially modulated light travels (along the light propagation axis) between the diffractive pattern (first hologram) and the first step/diffuser (i.e. corresponding to the first Fourier path length) is substantially the same as the distance that the spatially modulated light travels (along of the light propagation axis) between the diffractive pattern (second hologram) and the second step/diffuser (i.e. corresponding to the second Fourier path length). Thus, the holographic reconstruction corresponding to the first picture content is formed on the first step/diffuser of the screen assembly and the holographic reconstruction corresponding to the second picture content is formed on the second step/diffuser of the screen assembly.

There is provided a screen assembly for a head-up display comprises first and second diffusers arranged in a stepped configuration.

There is provided a vehicle comprising a head-up display as described above. The windscreen (or windshield) of the vehicle may be the optical combiner for forming first and second virtual images.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels. The term "diffractive pattern" is used herein to refer to the light modulation distribution or pattern encoded on the SLM.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels —that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

The term "eye-box" or "eye-motion box" is used herein to refer to an area where a viewer is able to see virtual images formed by the HUD. As known in the art, the eye-box is located on a "viewing plane". The term "virtual image distance" refers to the distance between a virtual image and the eye-box/viewing plane. The term "object distance" refers to the distance between an object (e.g. hologram) and an optic or optical system (comprising multiple optical elements) having optical power (e.g. powered mirror, magnifying lens or other optical element having optical power) used to form a corresponding magnified image (e.g. on a diffuser of the screen assembly). As described herein, an optical combiner (e.g. windscreen) is positioned, in use, within the focal length of the optical system having optical power of the HUD so as to form virtual images.

As the skilled person will appreciate, the individual rays of diffracted light from a diffractive pattern travel in multiple directions since the light is diffracted. Nevertheless, the bundle of rays forming the "beam" of diffracted light travels in a primary direction, corresponding to the axis of the beam. Accordingly, the term "light propagation path" (or "optical path") is used herein to refer to the direction or route of light rays travelling along the propagation axis (i.e. axis of the beam of light rays), which generally extends (substantially directly) between optical components of the system, as described herein.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures:

FIG. 7A shows an example arrangement for holographic reconstruction of first and second picture content on a common display plane.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
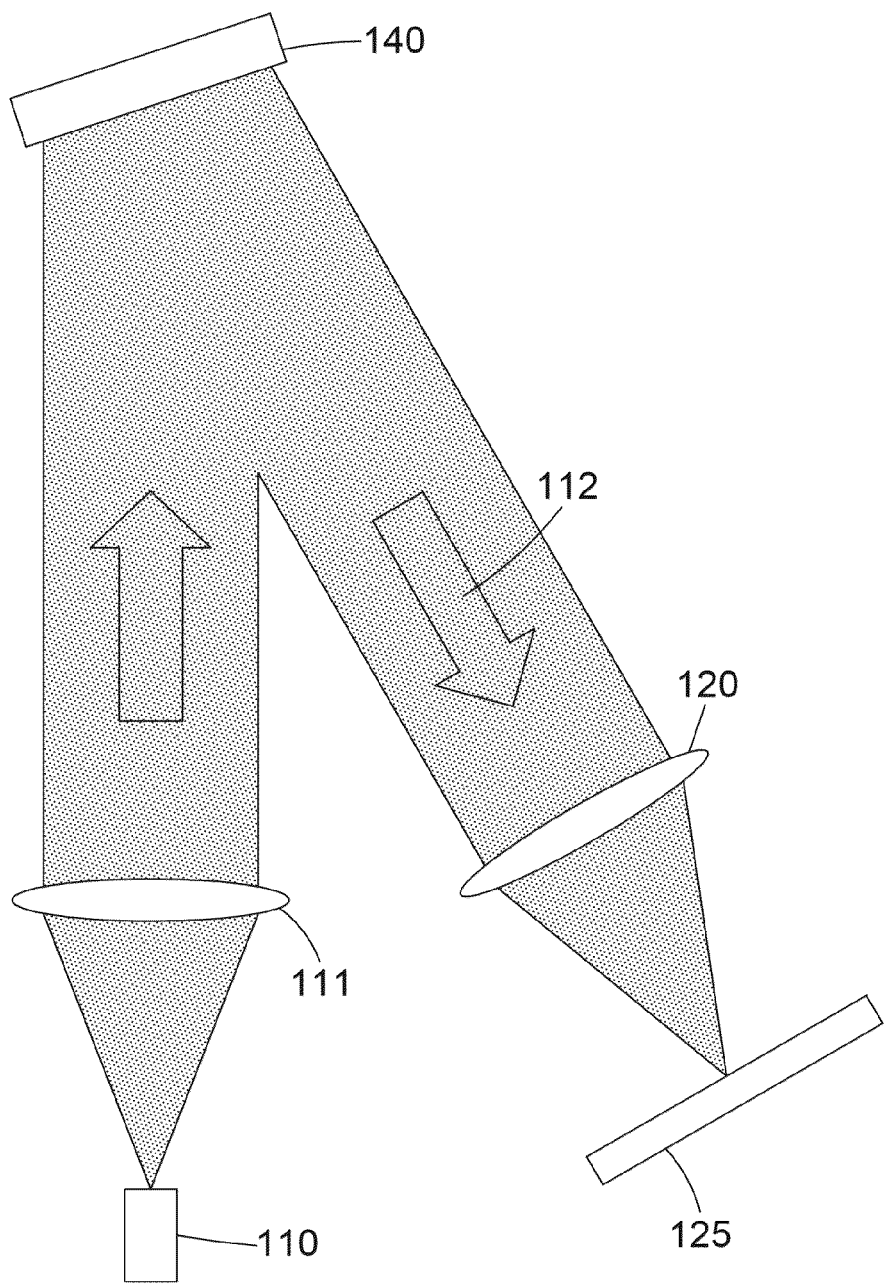
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
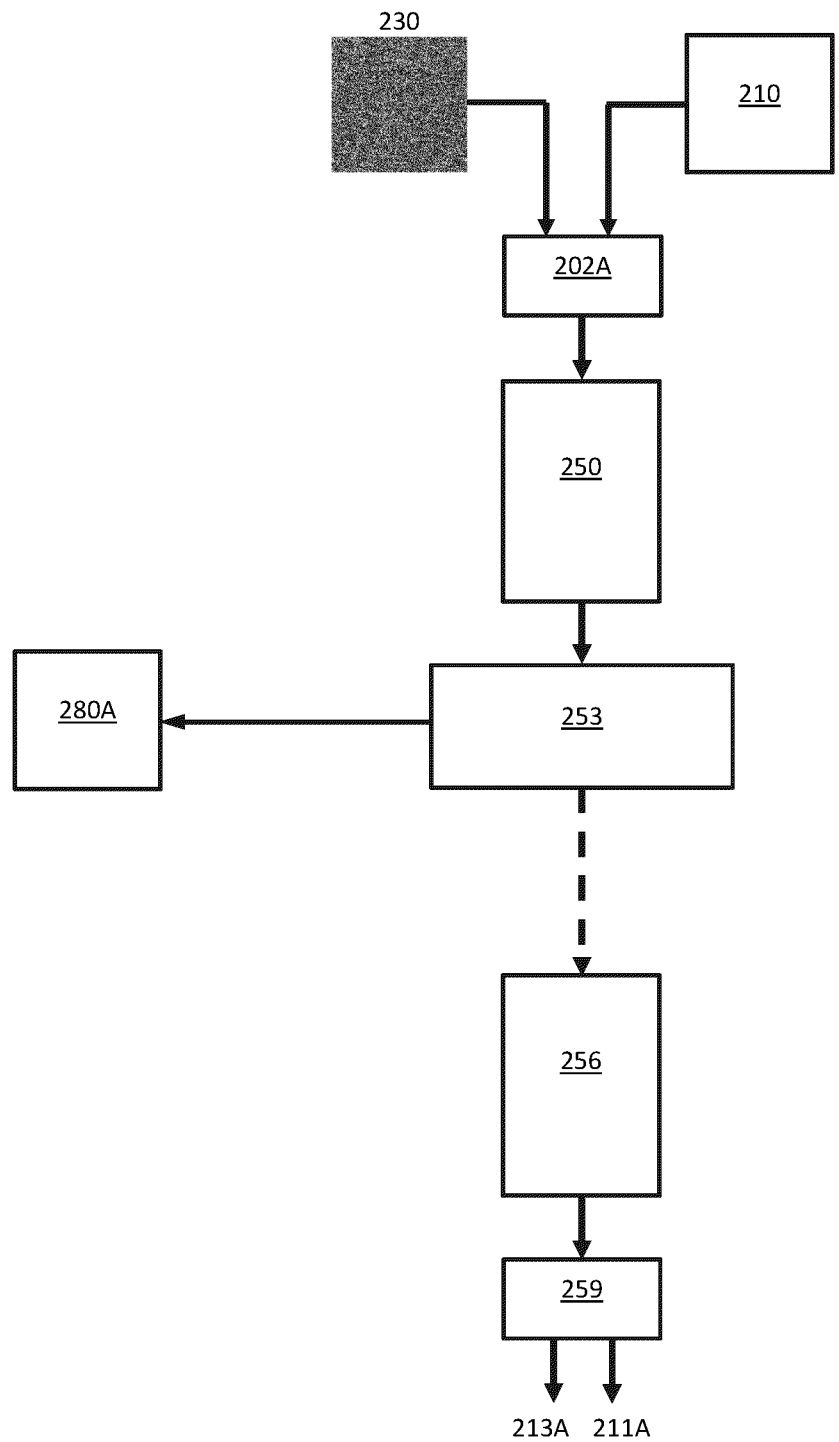
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
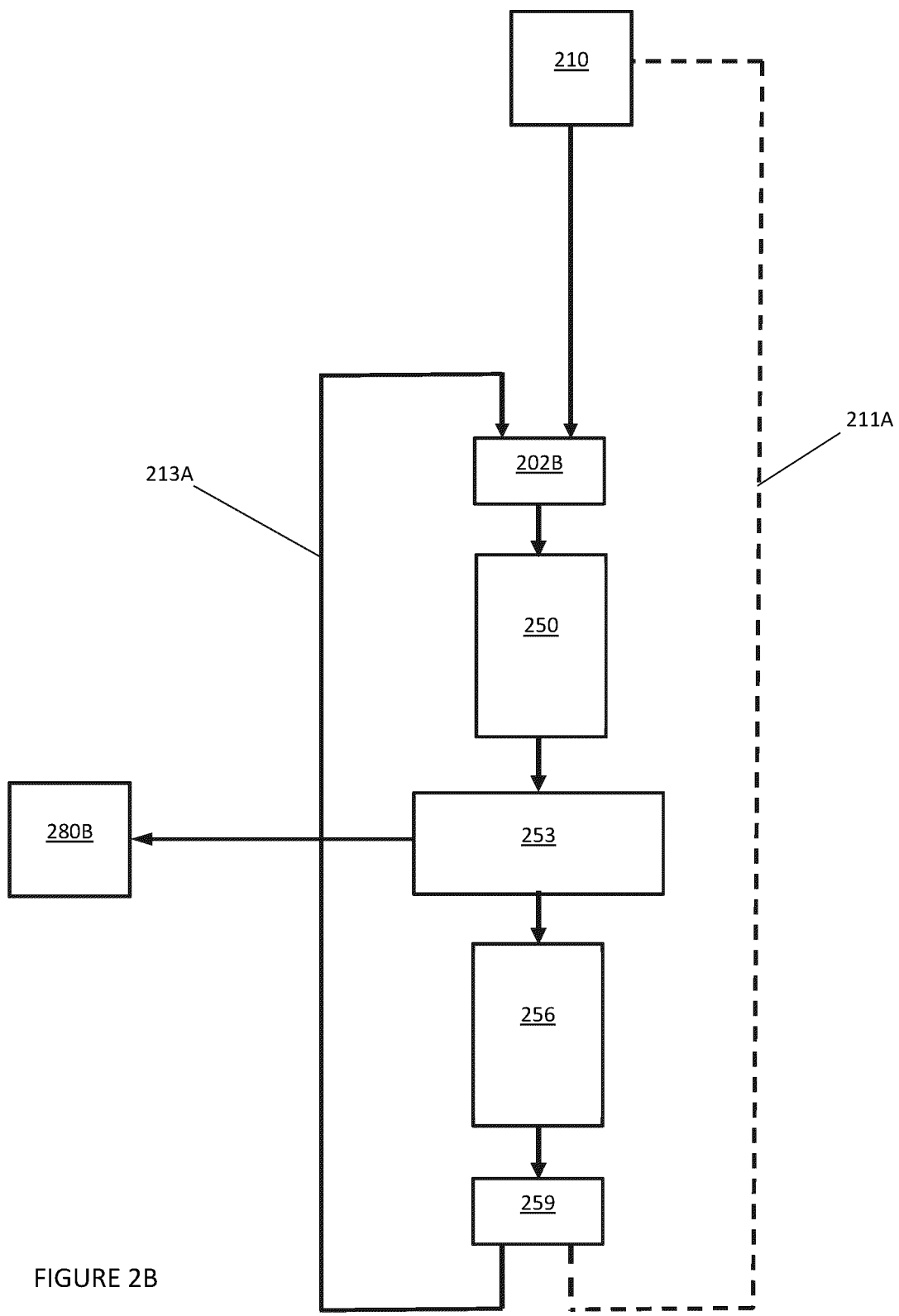
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
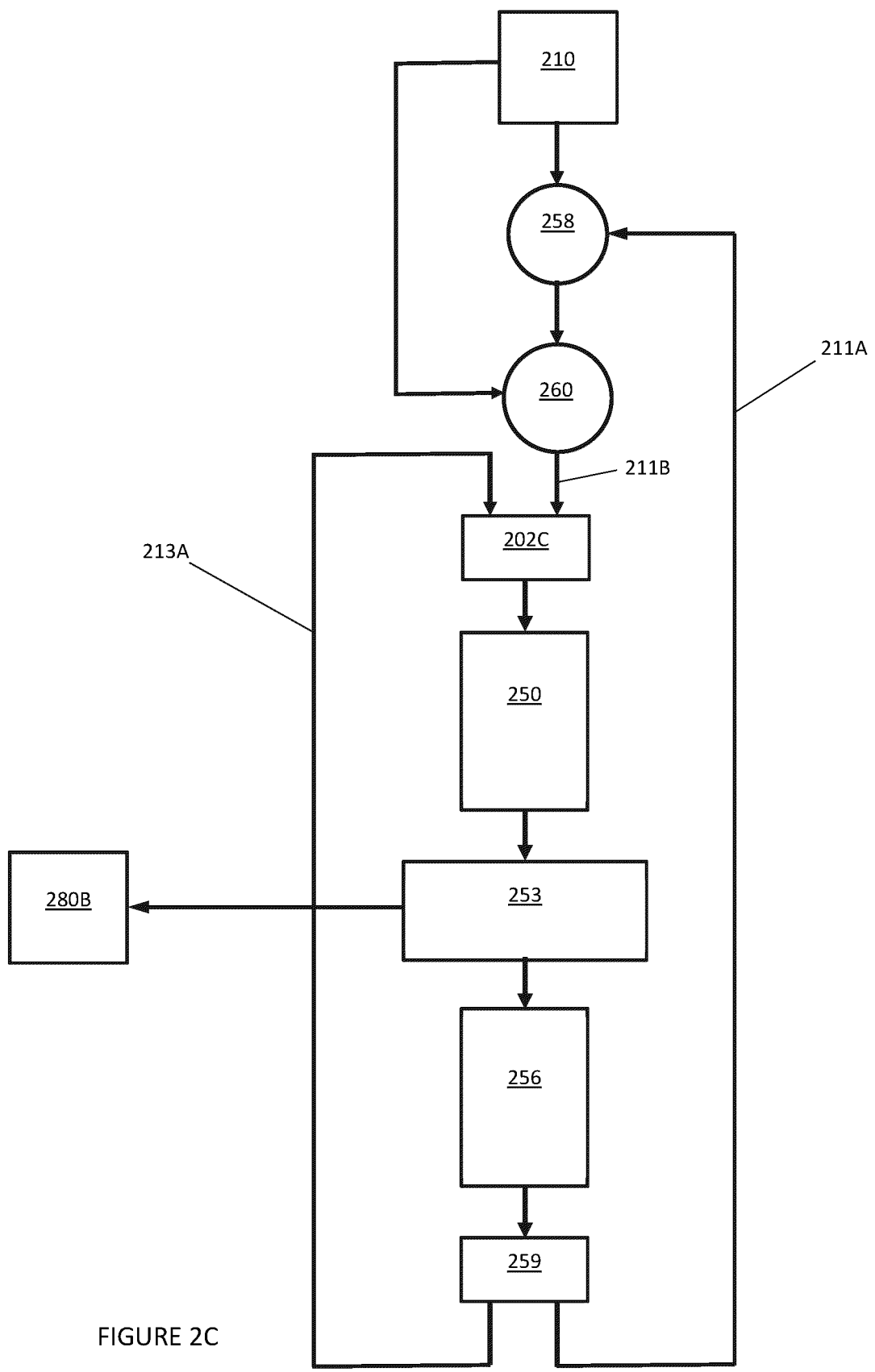
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta\cdot\exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
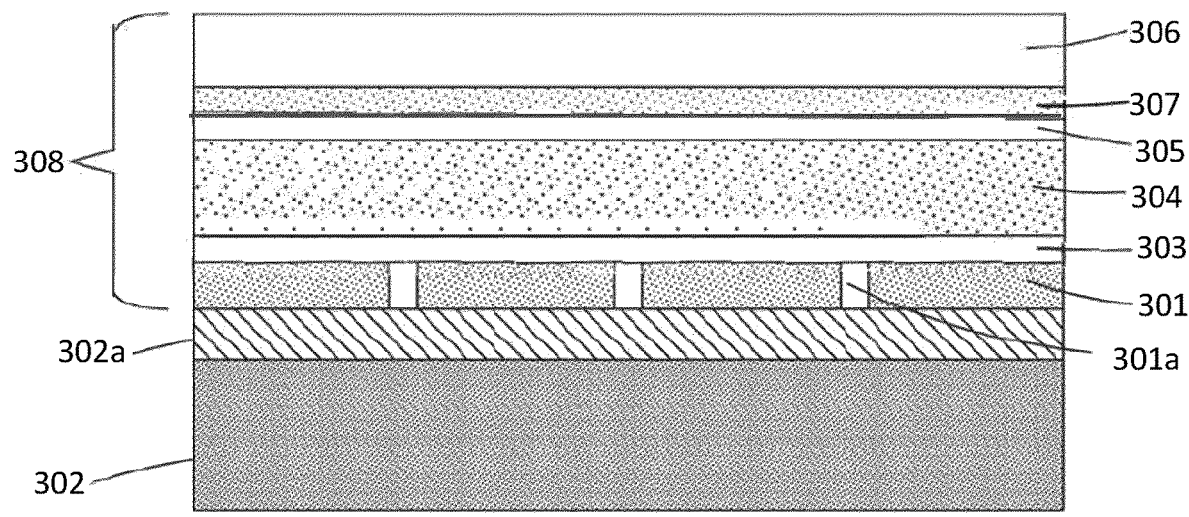
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Head-Up Display (HUD)—Single Plane

Figure 4:
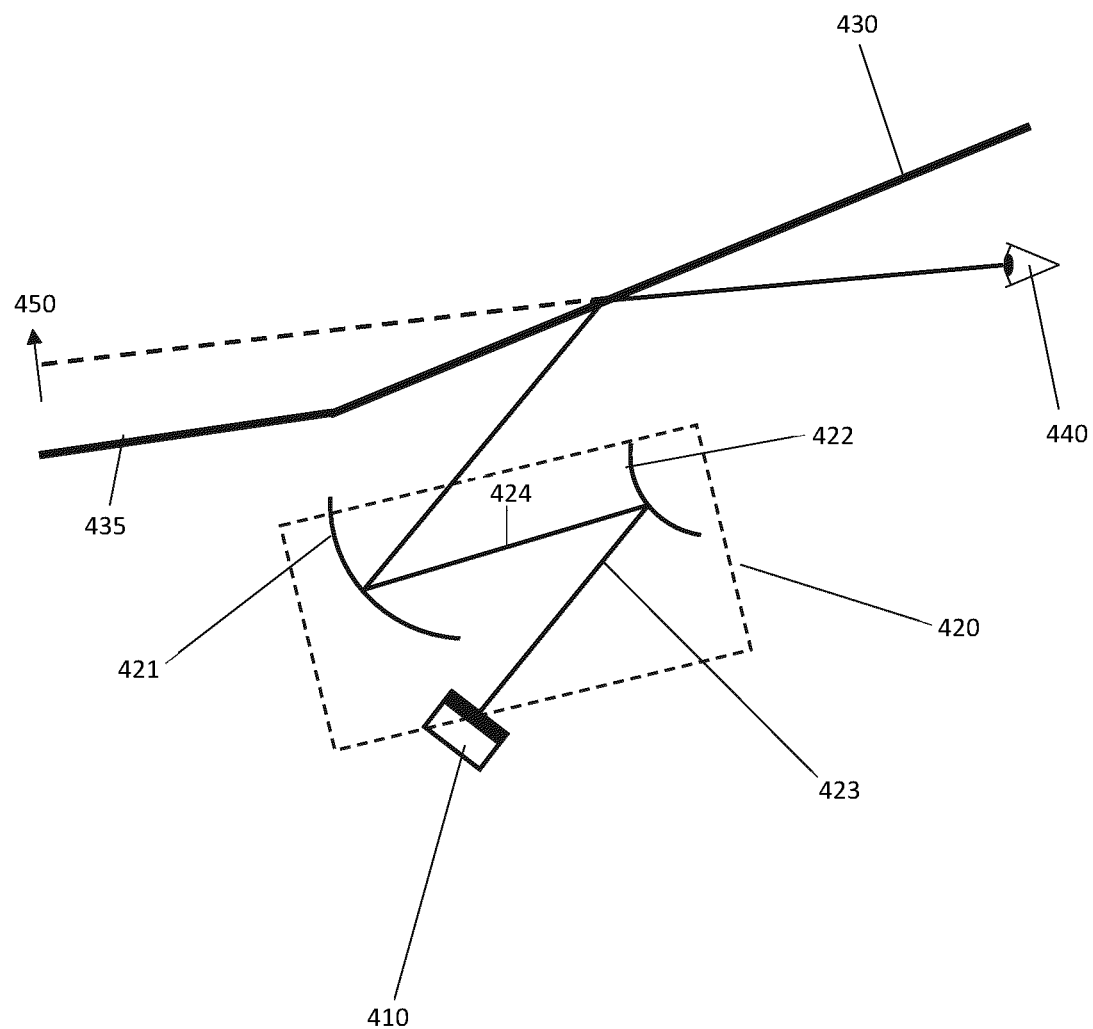
FIG. 4 shows an example arrangement of a head-up display in a vehicle.

FIG. 4 shows a HUD in a vehicle such as a car. The windscreen 430 and bonnet (or hood) 435 of the vehicle are shown in FIG. 4. The HUD comprises a picture generating unit, "PGU", 410 and an optical system 420.

The PGU 410 comprises a light source, a light receiving surface and a processor (or computer) arranged to computer-control the image content of the picture. The PGU 410 is arranged to generate a picture, or sequence of pictures, on the light receiving surface. The light receiving surface may be a screen or diffuser. In some embodiments, the light receiving surface is plastic (that is, made of plastic).

The optical system 420 comprises an input port, an output port, a first mirror 421 and a second mirror 422. The first mirror 421 and second mirror 422 are arranged to guide light from the input port of the optical system 420 to the output port of the optical system. Such an optical system may be referred to as an optical replay system, since it is arranged to relay light between an input port to an output port. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The rays illustrated in FIG. 4 show the direction of propagation of the light of the picture from PGU 410 along a propagation axis (herein referred to as "light propagation path" or "optical path" for ease of description) The light propagation path from the input port to the output port therefore comprises a first propagation path 423 (or first optical path component) from the input port to the second mirror 422 and a second propagation path 424 (or second optical path component) from the second mirror 422 to the first mirror 421. There is, of course, a third propagation path (or optical path component) from the first mirror 421 to the output port but that is not assigned a reference numeral in FIG. 4. The optical configuration shown in FIG. 4 may be referred to as a "z-fold" configuration owing to the shape of the light propagation path (i.e. rays travelling along the propagation axis) through optical system 420.

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system 420 is arranged to form a virtual image 450 of each picture in the windscreen 430 by reflecting light of the picture off the windscreen. The user 440 of the HUD (for example, the driver of the car) sees a virtual image 450 of the picture in, or through, the windscreen 430. Accordingly, in embodiments, the optical system 420 is arranged to form a virtual image 450 of each picture on a windscreen 430 of the vehicle. The virtual image 450 is formed a distance down the bonnet 435 of the car, which is dependent on the virtual image distance from a viewing plane of the user/driver 440. For example, the virtual image may be more than 1 metre from the user 440 such as more than 1.5 metres or 1.5 to 50 metres such as 1.5 to 20 metres from the user 440. The output port of the optical system 420 is aligned with an aperture in the dashboard of the car such that light of the picture is directed by the optical system 420 and windscreen 430 to the user/driver 440. In this configuration, the windscreen 430 functions as an optical combiner. In some embodiments, the optical system 420 is arranged to form a virtual image 450 of each picture on an additional optical combiner which is included in the arrangement. The windscreen 430, or additional optical combiner if included, combines light from the real-world scene with light of the picture. It may therefore be understood that the HUD may provide augmented reality including a virtual image of the picture. For example, the augmented reality information may include navigation information or information related to the speed of the automotive vehicle.

In some embodiments, the first mirror 421 and second mirror 422 are arranged to fold the light propagation path from the input to the output of the optical system 420 in order to increase the optical path length without overly increasing the physical size of the HUD. In some other embodiments, the second mirror 422 is omitted.

The picture formed on the light receiving surface (display surface) of the PGU 410 may only be a few centimetres in width and height. The first mirror 421 and second mirror 422 therefore, collectively or individually, provide magnification. That is, the first mirror 421 and/or second mirror 422 may have optical power (that is, dioptric or focusing power). The user 440 therefore sees a magnified virtual image 450 of the picture formed by the PGU 410. The first mirror 421 and second mirror 422 may also correct for optical distortions such as those caused by the windscreen 430 which typically has a complex curved shape. The folded light propagation path and optical power in the mirrors (and, optionally, the windscreen) together allow for suitable magnification of the virtual image of the picture.

The PGU 410 comprises a holographic projector and a light receiving surface such as a screen or diffuser. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving surface. That is, in some embodiments, each picture is formed by interference of the spatially-modulated light at the light receiving surface. It may be said that the light of the picture is spatially modulated light.

The dashboard of the vehicle comprises an aperture because the HUD requires an optical path (preferably, an unobstructed optical path) for light to the windscreen 430. However, this optical path between the windscreen and HUD equally allows ambient light, such as sunlight, to get into the HUD. This causes various problems. In examples, the first mirror 421 is therefore a cold mirror arranged to filter out infrared radiation. The cold mirror may reflect visible light but transmit infrared, "IR", light. In other examples, the first mirror 421 is a so-called hot/cold mirror which at least partially filters out IR and ultraviolet, "UV", light.

Head-Up Display—Dual-Plane

Figure 5:
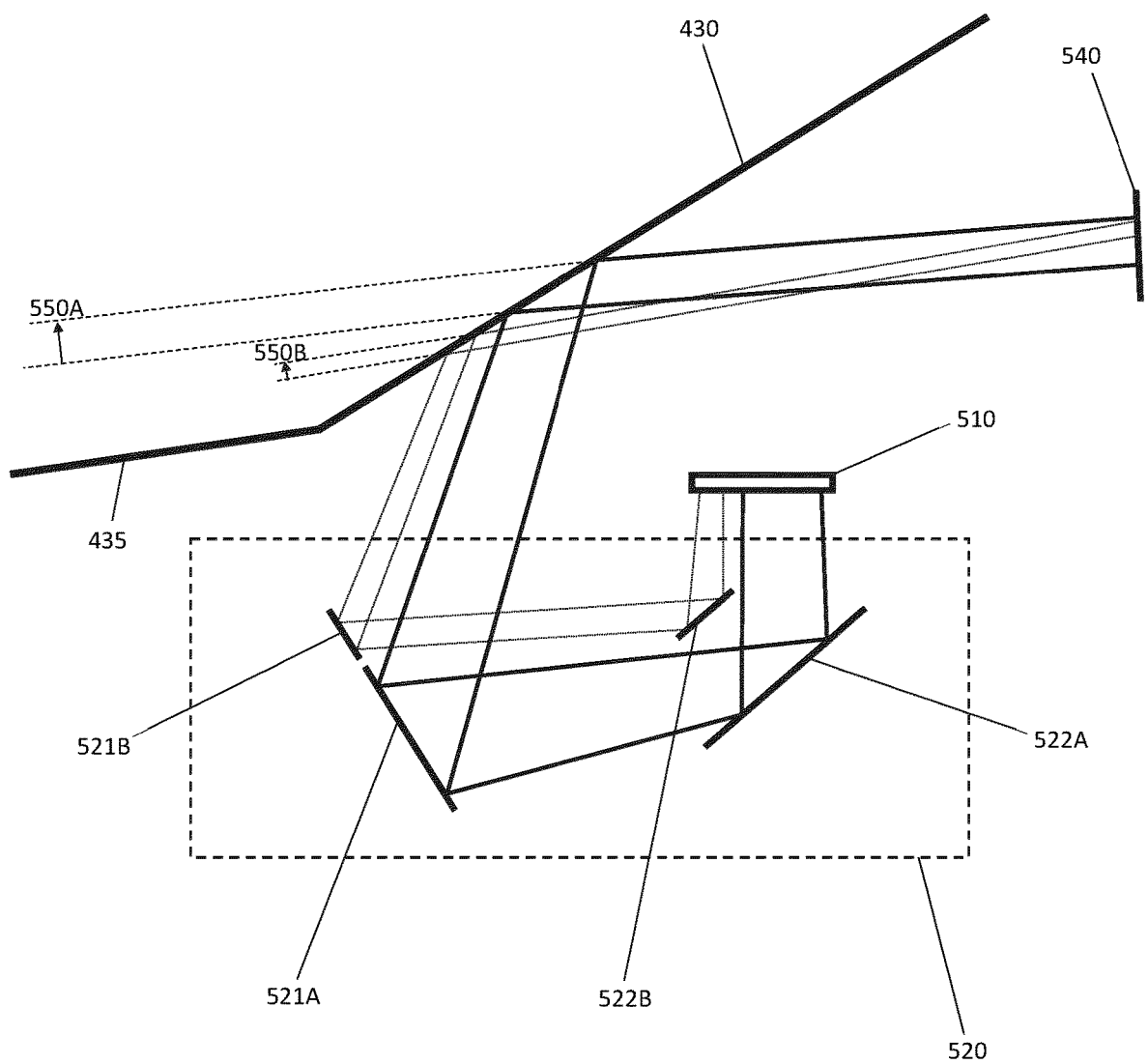
FIG. 5 shows another example arrangement of a head-up display in a vehicle.

FIG. 5 shows a dual-plane HUD arranged in a vehicle to present information to the driver at two different planes: a far-field plane for a first virtual image 550A and a near-field plane for a second virtual image 550B. The terms "far-field" and "near-field" are merely used to reflect that one plane is closer to the viewing plane 540 of the user/driver than the other and no analogy with near-field and far-field diffraction patterns should be made. The terms "far plane" and "near plane" may equally be used. By way of example only, the first virtual image 550A at the far-field plane may be navigation information which appears to overlay the road—e.g. lane highlighting—and the second virtual image 550B at the near-field plane may be speed and gear information. Such image content is formed at two different planes by using two different optical/light propagation paths to form two different virtual images, as explained in the following.

In more detail, FIG. 5 shows a picture generating unit 510 arranged to display a picture comprising a first picture component (e.g. comprising first picture content) and a second picture component (e.g. comprising second picture content). Light of the first picture component follows a first propagation path from the picture generating unit 510 to the viewing plane 540 and light of the second picture component follows a second propagation path from the picture generating unit 510 to the viewing plane 540. In the illustrated arrangements, the first propagation path is substantially parallel with the second propagation path over its entire length.

The first mirror 421 of FIG. 4 is replaced by a first far-field mirror 521A for the first propagation path and a first near-field mirror 521B for the second propagation path. The first far-field mirror 521A and first near-field mirror 521B are shown in FIG. 5 as separate optical components but they may equally be different reflective surfaces of a common component. The first far-field mirror 521A has a first optical power—e.g. first curvature—arranged to form a first virtual image 550A of the first picture component at a first virtual image distance from the viewing plane 540. The first near-field mirror 521B has a second optical power—e.g. second curvature—arranged to form a second virtual image 550B of the second picture component at a second virtual image distance from the viewing plane 540. The first virtual image distance is greater than the second virtual image distance. The first optical power is less than the second optical power]. The first far-field mirror 521A and first near-field mirror 521B may be freeform optical surfaces arranged to compensate for aberrations and the complex shape of the window of the vehicle.

The second mirror 422 of FIG. 4 is replaced by a second far-field mirror 522A and a second near-field mirror 522B. The second far-field mirror 522A is arranged to receive light of the first picture component from the picture generating unit 510 and direct that light onto the first far-field mirror 521A. The second near-field mirror 522B is arranged to receive light of the second picture component from the picture generating unit 510 and direct that light onto the first near-field mirror 521B.

In operation, light of the first picture component is directed onto the windscreen 430 by second far-field mirror 522A and then first far-field mirror 521A to form a first virtual image 550A of the first picture component in the windscreen 430 at a first virtual image distance from the viewing plane 540. Likewise, light of the second picture component is directed onto the windscreen 430 by second near-field mirror 522B and then first near-field mirror 521B to form a second virtual image 550B of the second picture component in the windscreen 430 at a second virtual image distance from the viewing plane 540, wherein the first virtual image distance is different to (in the illustrated arrangement, greater than) the second virtual image distance. The light propagation path (light propagation axis) corresponding to the second virtual image is substantially parallel to, but spatially-offset from, the light propagation path (light propagation axis) corresponding to the first virtual image. This enables the overall volume of the projection engine to be as small as possible. The first virtual image 550A and second virtual image 550B are spatially-separated—that is, offset in space—in order to provide a dual-plane display. The bundle of light rays forming the first virtual image 550A propagate along an axis generally parallel with the bundle of light rays forming the second virtual image 550B in the region from the picture generating unit 510 to the windscreen 430. More specifically, the volume of space formed by light rays of the first virtual image 550A is substantially parallel to volume of space formed by light rays of the second virtual image 550B in the region from the picture generating unit 510 to the windscreen 430. The volumes of space formed by the two sets of light rays intersect (i.e. cross) downstream the windscreen 430. Notably, whilst such a configuration has advantages in terms of compactness, it is not possible for the first virtual image 550A and second virtual image 550B to overlap whilst providing a flexible eye box at the viewing plane 540 which allows for normal head movement during operation. In short, the spatial separation of the two light channels required in this configuration results in a spatial separation of the virtual images 550A, 550B. The distance between the first virtual image 550A and second virtual image 550B is at least partially determined by the distance between the first near-field mirror 521B and the first far-field mirror 521A.

Stepped Diffuser Configuration

Figure 6:
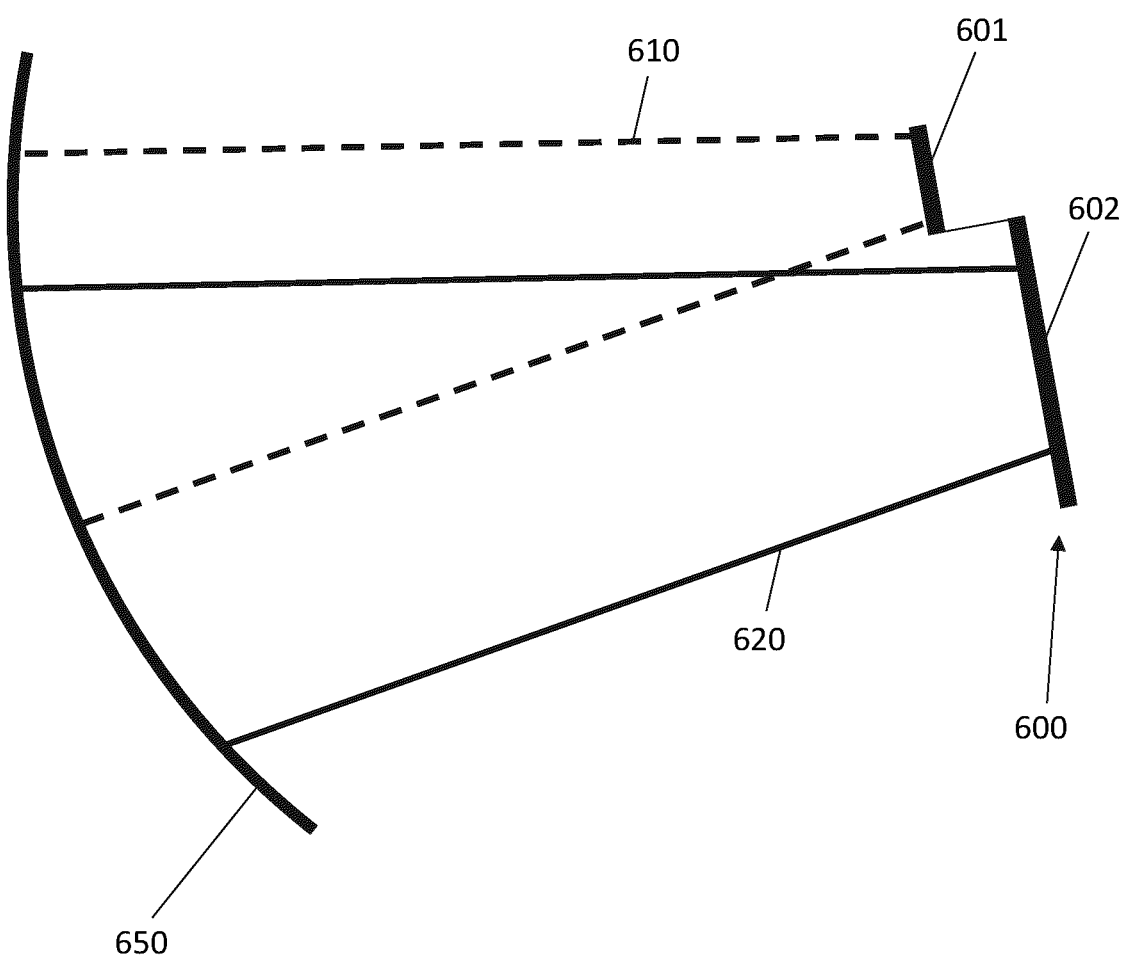
FIG. 6 shows a screen assembly comprising first and second stepped diffusers in accordance with embodiments.

FIG. 6 shows an arrangement of a screen assembly 600 of a PGU for a HUD in accordance with an embodiment of the present disclosure. In particular, the screen assembly 600 comprises a first diffuser 601 and a second diffuser 602 arranged in a stepped configuration.

In particular, a first diffuser 601 forms a first step of the screen assembly 600, and a second diffuser 602 forms a second step of the screen assembly 600. The first diffuser 601 and the second diffuser 602 have non-overlapping, substantially parallel planes. In particular, the first diffuser 601 is substantially parallel to the second diffuser 602. The first diffuser 601 is spatially offset from second diffuser 602 by a perpendicular distance (i.e. a distance in a direction perpendicular to the planes thereof). Thus, the first diffuser 601 and the second diffuser 602 may be integrally formed in the shape of a step. A spatial light modulator (not shown) of the PGU forms a holographic reconstruction of first picture content on first diffuser 601 and second picture content on second diffuser 602. For example, spatially modulated light comprising first picture content and second picture content may be output from the spatial light modulator along a respective light propagation path (propagation axis) to the first and second diffusers 601, 602, respectively. In some embodiments, by virtue of the stepped configuration, the distance from the spatial light modulator to the first diffuser is different to the distance from the spatial light modulator to the second diffuser, as described further below.

An optical element 650 having optical power is downstream of the screen assembly 600. Optical element 650 forms at least part of an optical system (optical relay system) of a dual-plane HUD. In the illustrated arrangement, optical element 650 comprises a freeform mirror and receives a first light ray bundle or "light cone" 610 comprising the first picture content from first diffuser 601 and a second light ray bundle/light cone 620 comprising the second picture content from second diffuser 602.

The optical element 650 may be used in cooperation with an optical combiner (not shown in FIG. 6) to form a first virtual image of the first picture content at a first virtual image distance and a second virtual image of the second picture content at a second virtual image distance, different to the first virtual image distance. In particular, in operation, an optical combiner such as a windscreen is positioned within the focal length of the optical element 650 (i.e. at a distance less that the focal length thereof) so as to form virtual images. Since the object distance between first diffuser 601 and optical element 650 is different from the object distance between second diffuser 602 and optical element 650, it is possible to use a common optical element 650 to form respective first and second virtual images on different virtual image planes.

In accordance with the present disclosure, the PGU comprises a spatial light modulator (not shown in FIG. 6) arranged to display a diffractive pattern comprising first picture content and second picture content, and a light source (not shown in FIG. 6) arranged to illuminate the diffractive pattern. For example, in some embodiments the diffractive pattern comprises a first component comprising a first hologram corresponding to the first picture content and a second component comprising a second hologram corresponding to the second picture content. The first picture content is formed (e.g. projected) on the first step/diffuser 601 of the screen assembly 600 and the second picture content is formed (e.g. projected) on the second step/diffuser 602 of the screen assembly 600. For example, the PGU may positioned to the right hand side of FIG. 6, upstream of screen assembly 600, first and second light ray cones 610, 620 and optical element 650.

In accordance with the present disclosure, the HUD further comprises an optical system arranged to receive light from the PGU. The optical system comprises at least optical element 650 having optical power. In operation, the optical system is arranged in cooperation with an optical combiner to form a first virtual image of the first picture content at a first virtual image distance from the eye-motion box at the viewing plane and a second virtual image of the second picture content visible at a second virtual image distance from the eye-motion box at the viewing plane. Notably, the first picture content and the second picture content may be displayed by the spatial light modulator/PGU at the same time or at different times. Correspondingly, the first virtual image and the second virtual image may be formed at the same time or at different times. In the illustrated example, the first picture content formed on the first step/diffuser 601 is optically relayed by optical element 650 to optical combiner (not shown) to form first virtual image at a first virtual image distance in the near-field of the viewer. The second picture content formed on the second step/diffuser 602 is optically relayed by optical element 650 to optical combiner (not shown in FIG. 6) to form second virtual image as a second virtual image distance in the far-field of the viewer. Thus, the second virtual image distance is greater than the first virtual image distance. Accordingly, a dual plane HUD comprising a first and second image claims is provided using a common (magnifying) optical system.

FIG. 6 shows the first light cone 610 comprising the first picture content overlapping the second light cone 620 comprising the first picture content between the screen assembly 600 and the optical element 650. However, this overlap is not always present, but rather typically arises when the light of the first light cone 610 is different from the light of the second light cone 620, for example different colours (wavelengths) or different polarisations.

Accordingly, there is provided a head-up display having an eye-motion box. The head-up display comprises a spatial light modulator arranged to display a diffractive pattern comprising a hologram of first picture content and/or second picture content. The head-up display comprises a screen assembly having a first diffuser and a second diffuser. The first and second diffuser may be integrally formed. The first and second diffusers are arranged in a stepped configuration so that the first diffuser is spatially offset from the second diffuser by a perpendicular distance. It may be said that the perpendicular distance from spatial light modulator to the first diffuser is different to the perpendicular distance from the spatial light modulator to the second diffuser. The head-up display comprises a light source arranged to illuminate the hologram such that the first picture content is formed the first diffuser and/or the second picture content is formed on the second diffuser. The head-up display further includes an optical system comprising at least one optical element having optical power. In use, the optical system is arranged in cooperation with an optical combiner to form a first virtual image of the first picture content at a first virtual image distance from the eye-motion box and/or a second virtual image of the second picture content visible at a second virtual image distance from the eye-motion box.

In some examples, the diffractive pattern of the PGU comprises a first component comprising a first Fourier hologram of the first picture content and a first lensing function, and a second component comprising a second Fourier hologram of the second picture content and a second lensing function. As described above, a lensing function (also referred to as a "software lens") defines the position of the replay plane along the light propagation path (i.e. propagation axis) from the spatial light modulator. Alternatively, the diffractive pattern comprises a Fresnel hologram of the first picture content and the second picture content.

In some embodiments, the first lensing function is different from the second lensing function, in order to achieve different first and second replay planes corresponding to the different (perpendicularly offset) positions of the first and second diffusers 601, 602 of the screen assembly 600. It may be said that the first picture content is associated with a different lensing function (or software lens) to the second picture content. Thus, the software lens encoded with each of the first component/picture content and the second component/picture content are used to form first/second holographic reconstructions at the different diffuser positions or object distances. Accordingly, the same optical system (comprising optical element 650) may be used to form first and second virtual images. In particular, the first and second light channels for forming the first and second virtual images may have a common propagation path (i.e. common light propagation axis) from the PGU to different virtual image planes. This simplifies the arrangement of the optical system of the HUD, as described below with reference to FIGS. 7A and 7B.

In other embodiments, the first lensing function is the same as the second lensing function, and the PGU is arranged to form the first and second picture content at the respective different (perpendicularly offset) positions of the first and second diffusers 601, 602 of the screen assembly 600. One suitable arrangement is described below with reference to FIG. 7B.

In some embodiments, the screen assembly may be arranged for movement for speckle reduction. For example, the screen assembly may be a stepped disc configured for rotation. Thus, each step/diffuser may be a ring or annulus of the disc, where the rings are offset from each other in a direction perpendicular to the plane of the disc.

COMPARATIVE EXAMPLE

FIG. 7A shows an example of a PGU of a dual-plane HUD, such as the example dual-plane HUD of FIG. 5. The PGU comprises a spatial light modulator 700A arranged to display a hologram comprising first picture content and second picture content, and a screen assembly comprising a first diffuser 731A and a second diffuser 732A. The screen assembly is arranged substantially orthogonally to the spatial light modulator 700A. In particular, first diffuser 731A and second diffuser 732A are arranged adjacent each other on a common plane, which is substantially orthogonal to the plane of spatial light modulator 700A. It may be said that first diffuser 731A and second diffuser 732A are coplanar. The PGU further comprises an optical element 720A arranged to fold the propagation path of spatially modulated light between spatial light modulator 700A and the screen assembly. In the illustrated example, optical element 720A comprises a fold mirror arranged at 45° to the propagation axis of light from spatial light modulator 700A so as to turn or fold the light propagation path (i.e. propagation axis) through an angle of 90°. In this way, light from spatial light modulator 700A is incident normally on the orthogonally arranged screen assembly.

Spatial light modulator 700A comprises a first subset of pixels 701A arranged to display a first component of the diffractive pattern comprising the first picture content (e.g. a first Fourier hologram of first picture content) and a first lensing function. Spatial light modulator 700A further comprises a second subset of pixels 702A arranged to display a second component of the diffractive pattern comprising the second picture content (e.g. a second Fourier hologram of second picture content) and a second lensing function.

Spatially modulated light of the first component is output by pixels 701A of spatial light modulator 700A as a first light ray bundle 711A along a first propagation path (e.g. Fourier path), and a holographic reconstruction of the first picture content is formed on first diffuser 731A. Similarly, spatially modulated light of the second component is output by pixels 702A of spatial might modulator 700A as a second light ray bundle 712A along a second propagation path (e.g. Fourier path), and a holographic reconstruction of the second picture content is formed on second diffuser 732A. Since the arrangement uses a common fold mirror 720A, and the first and second diffusers 731A, 732A are coplanar, the first propagation path length is the same as the second propagation path length. Thus, the first Fourier path length is the same as the second Fourier path length. Accordingly, the first lensing function of the first component of the hologram may be the same as the second lensing function of the second component of the hologram. It should be noted that the perpendicular distance 740A between the spatial light modulator 700A and first and second diffuser 731A, 732A, respectively, is the same. As the skilled person will appreciate, FIG. 7A illustrates the first and second light ray bundles 711A, 712A propagating in a direction parallel to the respective propagation axis thereof for ease of illustration.

As described above with reference to FIG. 5, a dual-plane HUD may use the first picture content displayed on first diffuser 731A to form a first virtual image at a first virtual image distance, and the second picture content displayed on second diffuser 732A to form a second virtual image at a second virtual image distance, different from the first virtual image distance, by means of an optical relay system 520, comprising two independent light propagation paths (i.e. light propagation axes), arranged with an optical combiner. The requirement for an optical system having two light propagation paths increases the complexity, cost and size of the optical system, and reduces flexibility.

Folded Fourier Path

Figure 7B:
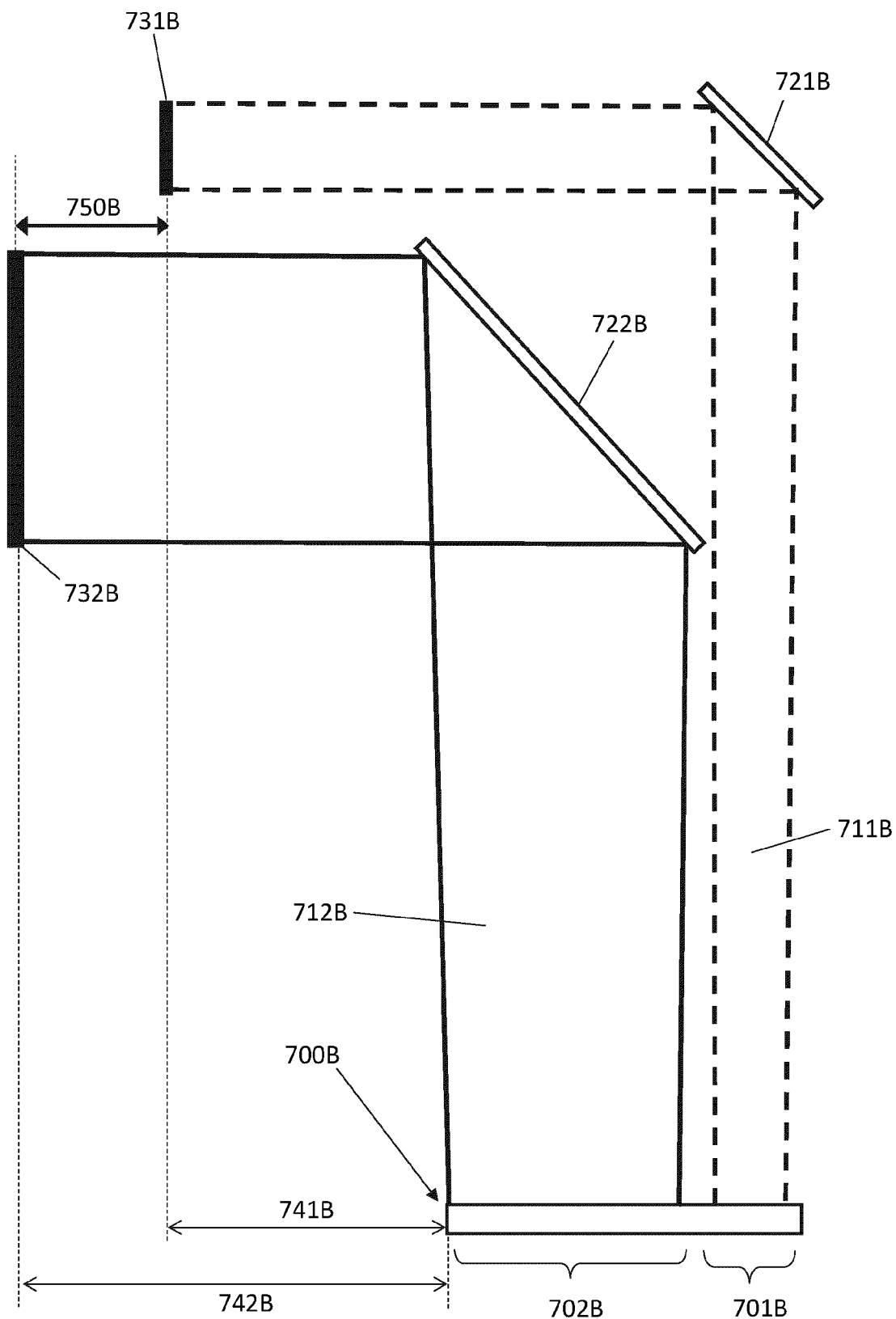
FIG. 7B shows an arrangement for holographic reconstruction of first and second picture content on respective first and second stepped diffusers at different display planes in accordance with embodiments.

FIG. 7B shows a PGU of a dual-plane HUD in accordance with embodiments of the present disclosure. The PGU comprises a spatial light modulator 700B arranged to display a diffractive pattern comprising first picture content and second picture content, and a screen assembly comprising a first diffuser 731B and a second diffuser 732B. As in the PGU arrangement of FIG. 7A, the screen assembly is arranged substantially orthogonally to the spatial light modulator 700B. However, first diffuser 731B and second diffuser 732B are arranged in a stepped configuration as described above with reference to FIG. 6. Thus, first and second diffusers 731B, 732B are arranged on different (non-overlapping) planes that are substantially parallel to each other and offset from each other by a perpendicular distance 750B (i.e. in a direction perpendicular to the planes thereof). The substantially parallel planes of the first and second diffusers 731B, 732B are substantially orthogonal to the plane of spatial light modulator 700B. The PGU further comprises first and second optical elements 721B, 722B arranged to fold the propagation path (i.e. propagation axis) of spatially modulated light between spatial light modulator 700B and the screen assembly. The first optical element 721B and the second optical element 732B are arranged in different planes, which are offset from, and substantially parallel to, each other. In the illustrated example, the first and second optical elements 721B, 722B each comprise a fold mirror arranged at 45° to the propagation axis of light from spatial light modulator 700B so as to turn or fold the light propagation path through an angle of 90°. In this way, the light from spatial light modulator 700B is incident on the orthogonally arranged screen assembly, as described further below.

As in the comparative example of FIG. 7A, spatial light modulator 700B comprises a first subset of pixels 701B arranged to display a first component of the diffractive pattern comprising the first picture content (e.g. a first Fourier hologram of first picture content) and a first lensing function. Spatial light modulator 700B further comprises a second subset of pixels 702B arranged to display a second component of the diffractive pattern comprising the second picture content (e.g. a second Fourier hologram of second picture content) and a second lensing function. In the illustrated arrangement, the first lensing function is the same as the second lensing function. This simplifies the calculation of the diffractive pattern for display on spatial light modulator 700B. In addition, the overall design of the holographic projector forming the PGU is simplified by maintaining the same Fourier path length for image content to be formed on different virtual image planes.

Spatially modulated light of the first component is output by first subset of pixels 701B of spatial light modulator 700B as a first light ray bundle 711B along a first propagation path (e.g. Fourier path), which is turned/folded through 90° by first optical element 721B and a holographic reconstruction of the first picture content is formed on first diffuser 731B. Similarly, spatially modulated light of the second component is output by second subset of pixels 702B of spatial might modulator 700B as a second light ray bundle 712B along a second propagation path (e.g. Fourier path), which is turned/folded through 90° by second optical element 721B and a holographic reconstruction of the second picture content is formed on second diffuser 732B. Similar to FIG. 7A, FIG. 7B illustrates the first and second light ray bundles 711B, 712B propagating in a direction parallel to the respective propagation axis thereof for ease of illustration.

The first and second optical elements 721B, 732B are arranged so that the total length of the first propagation path of first light ray bundle 711B (along the propagation axis) from the spatial light modulator to first diffuser 731B (i.e. first Fourier path length) is substantially the same as the total length of the second propagation path of second light ray bundle 712B (along the propagation axis) from spatial light modulator 700B to second diffuser 732B (second Fourier path length). In particular, in the illustrated arrangement, second diffuser 732B is spatially offset by perpendicular distance 750B from first diffuser 731B so that the perpendicular distance from the spatial light modulator 700B to second diffuser 732B is greater than the perpendicular distance from the spatial light modulator 700B to first diffuser 731B. The term "perpendicular distance" means the distance in a direction perpendicular to the plane of the first/second diffuser (i.e. in the direction of the perpendicular offset distance 750B).

In the illustrated arrangement, the first propagation path of first light ray bundle 711B (along the propagation axis thereof) comprises a first part between pixels 701B and first fold mirror 721B and a second part between first fold mirror 721B and first diffuser 731B. Similarly, the second propagation path of second light ray bundle 712B (along the propagation axis thereof) comprises a first part between pixels 702B and second fold mirror 722B and a second part between second fold mirror 722B and second diffuser 732B. The sum of the lengths of the first and second parts of the first propagation path (along the propagation axis thereof) is substantially the same as the sum of the lengths of the first and second parts of the second propagation path (along the propagation axis thereof). The first part of each of the first and second propagation paths is in a direction parallel to the plane of the first/second diffuser, and has a parallel distance from the spatial light modulator 700B to the first/second fold mirror, respectively. The term "parallel distance" means the distance parallel to the plane of the first/second diffuser. The second part of each of the first and second propagation paths is in a direction perpendicular to the plane of the first/second diffuser, and has a perpendicular distance from the first/second fold mirror to the first/second diffuser, respectively. Due to the stepped configuration of the diffusers as described herein, the perpendicular distance 741B from the spatial light modulator 700B to the first diffuser 731B is different from the perpendicular distance 742B from the spatial light modulator 700B to the second diffuser 732B. In the illustrated arrangement, the perpendicular distance 741B from the spatial light modulator 700B to the first diffuser 731B is less than the perpendicular distance 742B from the spatial light modulator 600B to the second diffuser 732B.

First fold mirror 721B is parallel to the second fold mirror. The first fold mirror 721B is spatially offset from second fold mirror 722B in both the parallel and perpendicular directions (i.e. by a parallel distance and a perpendicular distance) so that length of the first propagation path (along the propagation axis thereof) is substantially the same as the length of the second propagation path (along the propagation axis thereof). Accordingly, the first Fourier path length is substantially the same as the second Fourier path length. Thus, the first and second components of the diffractive pattern may use a common lensing function. For example, the first and second components of the diffractive pattern have the same software lensing function. Thus, in some embodiments, the lensing function associated with first picture content (e.g. first Fourier hologram) is the same as the lensing function associated with the second picture content (e.g. second Fourier hologram). This enables simpler computation of the diffractive pattern comprising first picture content and second picture content. Alternatively, or in addition, the first and second components of the diffractive pattern may share a common physical Fourier lens.

As described above, since first diffuser 731B and second diffuser 732B are arranged in a stepped configuration, a common optical system (optical relay system) may be used to provide a dual-plane HUD to form a first virtual image comprising first picture content at a first virtual image distance and a second virtual image comprising second picture content at a second virtual image distance different to the first virtual image distance. In particular, a holographic reconstruction of first image content formed on first diffuser 731B is at a first object distance from the common optical system and a holographic reconstruction of second image content formed on second diffuser 732B is at a second object distance from the common optical system. By virtue of the different object distances for the first and second picture content, it is possible to form respective virtual images at different virtual image distances or virtual image planes (e.g. in the near-field and in the far-field of the viewer).

In the arrangement of FIG. 7B, a first subset of pixels 701B of the spatial light modulator 700B is used to display a first hologram of the first picture content and a second subset of pixels 702B of the spatial light modulator 700B is used to display a second hologram of the second picture content. However, this is not essential. In other embodiments, the first hologram of the first picture content and the second hologram of the second picture content may be indistinguishably combined on some or all pixels of the spatial light modulator 700B. Furthermore, FIG. 7B shows the first and second subsets of pixels 701B, 702B formed from groups of adjacent pixels of the spatial light modulator 200B for ease of illustration only. As the skilled person will appreciate, in practice, some of the pixels of the subset of pixels used to the first or second display picture content may be spatial separated on the spatial light modulator.

OTHER EMBODIMENTS

In the embodiment of FIG. 7B, a folded light propagation path (along the propagation axis thereof) is formed between the spatial light modulator and the screen assembly within the PGU. In particular, in the illustrated embodiment, the display plane of the spatial light modulator is orthogonal to the first diffuser plane and the second diffuser plane, respectively. However, this is not essential.

In other embodiments, a direct (i.e., non-folded) light propagation path (along the propagation axis thereof) is provided between the spatial light modulator and the screen assembly within the PGU. Thus, the display plane of the spatial light modulator is parallel to the respective planes of the first and second diffusers. The light propagation path (along the propagation axis thereof) extends in the perpendicular direction from the spatial light modulator to the screen assembly.

In examples of these embodiments, the first lensing function associated with the first picture content (e.g. first Fourier hologram) is different to the second lensing function associated with the second picture content (e.g. second Fourier hologram). In particular, the first lensing function forms a holographic reconstruction of the first picture content on a first replay plane corresponding to first diffuser and the second lensing function forms a holographic reconstruction of the second picture content on a second replay plane corresponding to the second diffuser. By virtue of the stepped configuration of the first and second diffusers, the second replay plane is different to the first replay plane. It may be said that the second replay plane is at a different distance along the light propagation axis from the spatial light modulator to that of the first replay plane. The second replay plane is offset from the first replay plane by a perpendicular distance, corresponding to the perpendicular offset distance of the first and second diffusers. In other examples, different physical Fourier lenses may be used instead of different first and second lensing functions.

In some embodiments, the diffractive pattern displayed on the spatial light modulator uses the same lensing function for the first picture content and the second picture content, and the first Fourier path length is substantially the same as the second Fourier path length. It may be said that the distance of the light propagation path from the diffractive pattern (first picture content) to the first diffuser is the same as the distance of the light propagation path from the diffractive pattern (second picture content) to the second diffuser. However, as described herein, the first and second diffusers are arranged in a stepped configuration. Thus, the first diffuser is spatially offset from the second diffuser by a distance in a direction perpendicular to the planes thereof (which are substantially parallel). In consequence, the first and second diffusers are at different distances along the propagation path of the spatially modulated light.

In the example of FIG. 7B, first and second fold mirrors are arranged along the respective propagation paths to the first and second diffusers to provide the same Fourier path length. Accordingly, the distance along the propagation path from diffractive pattern (first picture content) to the first diffuser is the same as the distance along the propagation path from diffractive pattern (second picture content) to the second diffuser. As the skilled person will appreciate, other arrangements of optical elements (e.g. reflective or refractive optical elements such as mirrors, lenses and optical blocks) are possible to provide the same Fourier path length to the first and second diffusers. In particular, different optical elements may be provided along the propagation axis between the spatial light modulator/diffractive pattern and the first diffuser (i.e. the path of spatially modulated light comprising the first picture content) and the propagation axis between the spatial light modulator/diffractive pattern and the second diffuser (i.e. the path of spatially modulated light comprising the second picture content) to provide the same Fourier path length to both the first and second diffusers. In some embodiments, this can be achieved without folding the light propagation path (Fourier path) from the spatial light modulator/diffractive pattern to each of the first and second diffusers. For example, US2004/075919A describes a transparent refractive element that enables the optical path length of an optical path between a first end and a second end thereof to be adjusted without changing the physical distance between the first and second ends. Such an element can used in the light propagation path between the spatial light modulator/diffractive pattern and at least one of the first and second diffusers, so that the length of the light propagation paths of spatially modulated light to the respective first and second diffusers is the same.

The above examples and embodiments implement a Fourier hologram of the first and second picture content. In other examples and embodiments, the hologram displayed on the spatial light modulator is a Fresnel hologram encoding picture content for a first diffuser plane and picture content for a second diffuser plane.

In some embodiments, the first picture content and the second picture content are formed on the screen assembly at the same time. For example, as shown in FIG. 7B, the first subset of pixels 701B of spatial light modulator 700B display a first hologram of the first picture content at the same time as the second subset of pixels 702B of spatial light modulator 700B display a second hologram of the second picture content. Thus, a holographic reconstruction of the first picture content is formed on first diffuser 731B at the same time as a holographic reconstruction of the second picture content is formed on second diffuser 732B. In consequence, corresponding first and second virtual images of the first and second picture content may be formed by the HUD on respective virtual image planes, as in the arrangement of FIG. 5.

In other embodiments, the first picture content and the second picture content of formed on the screen assembly at different times, in particular, although not exclusively, within the integration time of the human eye. For example, the first picture content and the second picture content may be formed on the screen assembly in accordance with a suitable time multiplexing scheme. The viewer is able to see respective first and second virtual images at different distances at the same point in time.

As the skilled person will appreciate, the principles of the present disclosure can be extended for more complex HUDs comprising three or more virtual image planes, simply by adding steps/diffusers to the stepped configuration of the screen assembly.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser such as a laser diode. The holographic projection system of the present disclosure may be used to provide an improved head-up display (HUD). In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affected by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the hologram is smaller than the spatial light modulator. More specifically, the number of hologram pixels is less than the number of light-modulating pixels available on the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator. In some embodiments, the technique of "tiling" is implemented to increase image quality. Specifically, some embodiments implement the technique of tiling to minimise the size of the image pixels whilst maximising the amount of signal content going into the holographic reconstruction. In some embodiments, the holographic pattern written to the spatial light modulator comprises at least one whole tile (that is, the complete hologram) and at least one fraction of a tile (that is, a continuous subset of pixels of the hologram).

In embodiments, only the primary replay field is utilised and system comprises physical blocks, such as baffles, arranged to restrict the propagation of the higher order replay fields through the system.

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

The method of SSC uses three spatially-separated arrays of light-modulating pixels for the three single-colour holograms. An advantage of the SSC method is that the image can be very bright because all three holographic reconstructions may be formed at the same time. However, if due to space limitations, the three spatially-separated arrays of light-modulating pixels are provided on a common SLM, the quality of each single-colour image is sub-optimal because only a subset of the available light-modulating pixels is used for each colour. Accordingly, a relatively low-resolution colour image is provided.

The method of FSC can use all pixels of a common spatial light modulator to display the three single-colour holograms in sequence. The single-colour reconstructions are cycled (e.g. red, green, blue, red, green, blue, etc.) fast enough such that a human viewer perceives a polychromatic image from integration of the three single-colour images. An advantage of FSC is that the whole SLM is used for each colour. This means that the quality of the three colour images produced is optimal because all pixels of the SLM are used for each of the colour images. However, a disadvantage of the FSC method is that the brightness of the composite colour image is lower than with the SSC method—by a factor of about 3—because each single-colour illumination event can only occur for one third of the frame time. This drawback could potentially be addressed by overdriving the lasers, or by using more powerful lasers, but this requires more power resulting in higher costs and an increase in the size of the system.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A head-up display comprising:
a spatial light modulator configured to display a diffractive pattern encoding first picture content and second picture content, wherein the diffractive pattern comprises (i) a first component comprising a first Fourier hologram of the first picture content and a first lensing function and (ii) a second component comprising a second Fourier hologram of the second picture content and a second lensing function that is the same as the first lensing function;
a screen assembly comprising a first diffuser and a second diffuser, wherein the first diffuser and the second diffuser are arranged in a stepped configuration so that the first diffuser is spatially offset from the second diffuser by a perpendicular distance;
a light source configured to illuminate the diffractive pattern such that the first picture content is formed on the first diffuser and the second picture content is formed on the second diffuser; and
an optical system comprising at least one optical element having optical power, wherein the first and second diffusers have different object distances to the at least one optical element of the optical system.

2. The head-up display according to claim 1 wherein, in operation, the at least one optical element is configured to relay the first picture content formed on the first diffuser or the second picture content formed on the second diffuser along a common light propagation path along a propagation axis towards an optical combiner for forming respective virtual images at different virtual image distances from a viewing plane.

3. The head-up display according to claim 1, wherein an optical element is arranged along at least one of a first light propagation path between the spatial light modulator and the first diffuser and a second light propagation path between the spatial light modulator and the second diffuser such that the first light propagation path has the same length along its propagation axis as the second light propagation path.

4. The head-up display according to claim 3, further comprising:
a first optical element arranged along a propagation axis of the first light propagation path between the spatial light modulator and the first diffuser, the first optical element arranged to fold the first light propagation path; and
a second optical element arranged along a propagation axis of the second light propagation path between the spatial light modulator and the second diffuser, the second optical element arranged to fold the second light propagation path,
wherein the first optical element and the second optical element are spatially separated so that the first light propagation path has the same length along its propagation axis as the second light propagation path.

5. The head-up display according to claim 3, wherein the optical element is arranged along at least one of the first light propagation path between the spatial light modulator and the first diffuser and the second light propagation path between the spatial light modulator and the second diffuser, wherein the at least one optical element is arranged to adjust the optical path length such that the first light propagation path has the same length along its propagation axis as the second light propagation path.

6. The head-up display according to claim 5, wherein the optical element comprises a refractive optical element arranged to adjust an optical path length of light propagating therethrough.

7. The head-up display according to claim 1 wherein the screen assembly is arranged orthogonal to the spatial light modulator and wherein the perpendicular distance from the spatial light modulator to the first diffuser is different to the perpendicular distance from the spatial light modulator to the second diffuser.

8. The head-up display according to claim 1 wherein the first picture content and the second picture content are formed on the screen assembly at the same time.

9. The head-up display according to claim 1 wherein the first picture content and the second picture content are formed at different times within an integration time of a human eye in accordance with a time multiplexing scheme.

10. The head-up display according to claim 1 wherein the first diffuser and the second diffuser of the screen assembly are integrally formed.

11. The head-up display according to claim 10, wherein the screen assembly comprises one of (i) a stepped disc or (ii) a rotatable disc.

12. The head-up display according to claim 1, wherein the diffractive pattern comprises a Fresnel hologram of the first picture content and the second picture content.

13. A screen assembly configured for use in a head-up display system configured to generate holographic reconstructions using a spatial light modulator arranged to display a diffractive pattern encoding first picture content and second picture content, wherein the diffractive pattern comprises (i) a first component comprising a first Fourier hologram of the first picture content and a first lensing function and (ii) a second component comprising a second Fourier hologram of the second picture content and a second lensing function that is the same as the first lensing function, wherein the screen assembly comprises:
a first diffuser and a second diffuser arranged in a stepped configuration so that the first diffuser is spatially offset from the second diffuser by a perpendicular distance;
wherein the first diffuser is configured to receive and display a first holographic reconstruction of the first picture content formed by illuminating the first component of the diffractive pattern comprising the first Fourier hologram and the first lensing function;
wherein the second diffuser is configured to receive and display a second holographic reconstruction of the second picture content formed by illuminating the second component of the diffractive pattern comprising the second Fourier hologram and the second lensing function that is the same as the first lensing function; and wherein the first and second diffusers have different object distances relative to an optical system having optical power for forming respective virtual images at different virtual image distances from a viewing plane.

14. A vehicle comprising a head-up display, wherein the head-up display comprises:

a spatial light modulator configured to display a diffractive pattern encoding first picture content and second picture content, wherein the diffractive pattern comprises (i) a first component comprising a first Fourier hologram of the first picture content and a first lensing function and (ii) a second component comprising a second Fourier hologram of the second picture content and a second lensing function that is the same as the first lensing function;

a screen assembly comprising a first diffuser and a second diffuser, wherein the first diffuser and the second diffuser are arranged in a stepped configuration so that the first diffuser is spatially offset from the second diffuser by a perpendicular distance;

a light source configured to illuminate the diffractive pattern such that the first picture content is formed on the first diffuser and the second picture content is formed on the second diffuser; and an optical system comprising at least one optical element having optical power, wherein the first and second diffusers have different object distances to the at least one optical element of the optical system.

15. The vehicle of claim 14, wherein in operation, the at least one optical element is configured to relay the first picture content formed on the first diffuser or the second picture content formed on the second diffuser along a common light propagation path along a propagation axis towards an optical combiner for forming respective virtual images at different virtual image distances from a viewing plane.

16. The vehicle of claim 15, further comprising:

a windscreen, wherein the optical combiner comprises at least a portion of the windscreen.

17. The vehicle of claim 15, wherein the screen assembly is arranged orthogonal to the spatial light modulator and wherein the perpendicular distance from the spatial light modulator to the first diffuser is different than the perpendicular distance from the spatial light modulator to the second diffuser.

* * * * *